United States Patent

Asao et al.

[11] 4,031,171
[45] June 21, 1977

[54] ULTRASONIC AIR HUMIDIFYING APPARATUS

[75] Inventors: Makoto Asao, Tokyo; Susumu Ito, Yokosuka; Hidetoshi Umehara, Sagamihara, all of Japan

[73] Assignee: Mikuni Kogyo Kabushiki Kaisha, Tokyo, Japan

[22] Filed: Dec. 23, 1975

[21] Appl. No.: 643,867

[30] Foreign Application Priority Data

Dec. 25, 1974 Japan .............. 49-156751[U]

[52] U.S. Cl. .............. 261/1; 239/102; 259/DIG. 44; 261/30; 261/119 R; 261/DIG. 48

[51] Int. Cl.² .............. B01F 3/04

[58] Field of Search .......... 261/30, 78 A, 1, 119 R, 261/DIG. 48, DIG. 65, 81, 82, 142, 91; 128/194, DIG. 2; 239/102; 259/DIG. 44, DIG. 41, DIG. 42, DIG. 43

[56] References Cited

UNITED STATES PATENTS

| | | | |
|---|---|---|---|
| 2,046,802 | 7/1936 | Van Vliet et al. .............. | 261/30 X |
| 3,188,007 | 6/1965 | Myklebust .............. | 261/91 X |
| 3,325,976 | 6/1967 | West .............. | 261/1 X |
| 3,387,607 | 6/1968 | Gauthier et al. .............. | 128/DIG. 2 |
| 3,469,785 | 9/1969 | Boucher et al. .............. | 261/DIG. 48 |
| 3,490,697 | 1/1970 | Best, Jr. .............. | 261/DIG. 48 |
| 3,561,444 | 2/1971 | Boucher .............. | 128/194 |
| 3,624,696 | 11/1971 | Cohen et al. .............. | 261/119 R X |
| 3,806,100 | 4/1974 | Cornett et al. .............. | 261/1 |
| 3,892,235 | 7/1975 | Van Amerongen et al. .... | 261/DIG. 65 |

FOREIGN PATENTS OR APPLICATIONS 576,213  5/1933  Germany .............. 261/142

Primary Examiner—Tim R. Miles
Assistant Examiner—Richard L. Chiesa
Attorney, Agent, or Firm—Cushman, Darby & Cushman

[57] ABSTRACT

An ultrasonic air humidifying apparatus comprising separably connected upper and lower cabinets; a power transformer, high frequency generator and motor-blower contained in the upper cabinet; a water vessel formed in the lower cabinet; a chassis board interposed between the upper cabinet and lower cabinet so as to define an airtight space above the surface of water in the water vessel; a mist conduit pipe fixed to the chassis board, inserted at the lower end into the water in the water vessel and projected at the upper end out of the top part of the upper cabinet; an ultrasonic vibrator assembly fitted to the lower end of the mist conduit pipe; and a water supply tank removably fitted in the upper cabinet so as to supply water into the water vessel, in order to obtain an ultrasonic air humidifying apparatus easy to clean and inspect and high in the performance.

12 Claims, 9 Drawing Figures

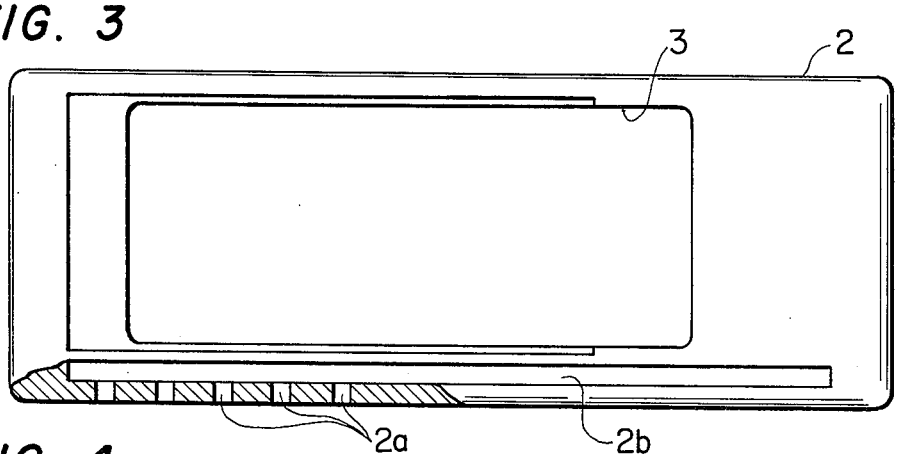
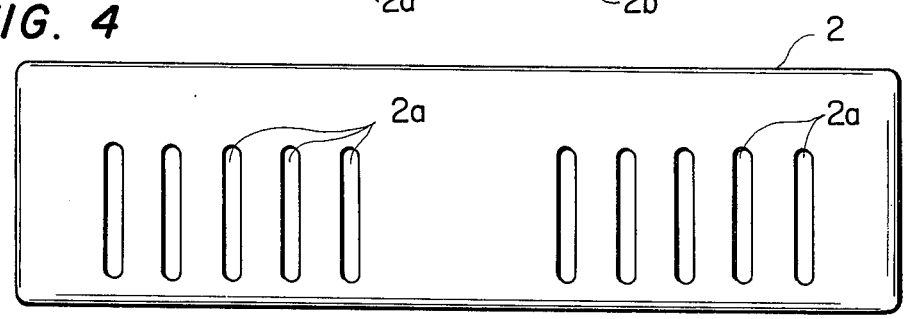
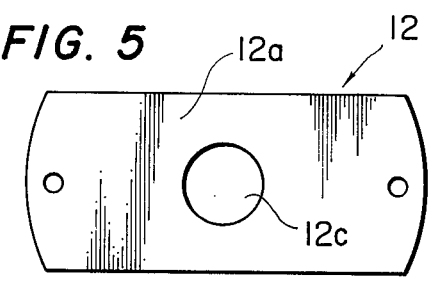
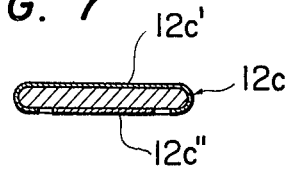
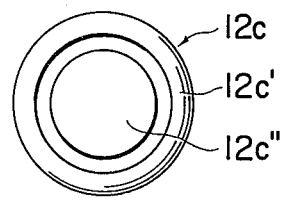
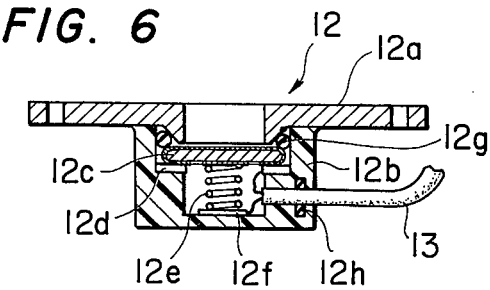
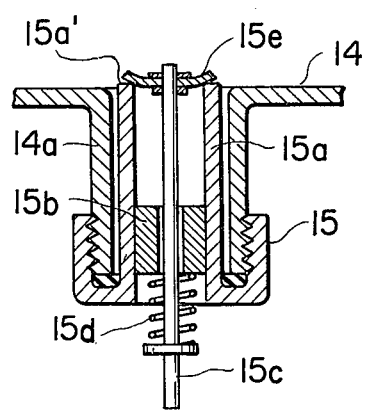

4,031,171

ULTRASONIC AIR HUMIDIFYING APPARATUS

BACKGROUND OF THE INVENTION a. Field of the Invention

This invention relates to an ultrasonic air humidifying apparatus, and, more particularily, to the construction or the arrangement of components of an ultrasonic air humidifying apparatus.

b. Description of the Prior Art

In an ultrasonic air humidifying apparatus of the prior art, an ultrasonic vibrator incorporated in a casing is installed on the lower surface of the bottom of a water vessel and all the electrical components, e.g., a high-frequency generator, a power transformer and a motor-blower, are arranged in a cabinet under the water vessel. The aforementioned ultrasonic air humidifying apparatus of the prior art has drawbacks such as the following:

1. Damage to the electrical components, resulting from water leaks between the casing containing the ultrasonic vibrator and the water vessel, or through an air passage connecting the motor-blower outlet and the space over the water surface in the vessel when water is supplied or when the water vessel is washed or cleaned. The water vessel and the cabinet for electrical components cannot be separated even when the water vessel is washed or cleaned because the high frequency generator and ultrasonic vibrator are connected by a pair of cables.

2. Inaccessibility to the electrical components, when servicing is required, for the same reason as mentioned in (1) above.

3. Difficulty in arranging a water supply tank which serves to keep the water level in the water vessel constant for several hours at the lower end of the water outlet of the water supply tank, in spite of the fact that the mist producing capacity varies with the water level in the water vessel. 4. Accumulation of dirt particles and mineral substance, brought by air and water, around or over the ultrasonic vibrator.

SUMMARY OF THE INVENTION

It is an object of this invention to provide an untrasonic air humidifying apparatus in which the water vessel is placed at the bottom of the cabinet and to ensure that the damage to the electrical components due to water leaks will never result.

Another object of this invention is to provide an ultrasonic air humidifying apparatus, whose electrical components are so arranged as to allow easy access for servicing.

A further object of this invention is to provide an ultrasonic air humidifying apparatus in which the water level in the water vessel is kept constant by using an airtight water supply tank, the said water level being kept at the lower end of the water outlet of the said airtight water supply tank.

Still another object of this invention is to provide an ultrasonic air humidifying apparatus of high mist producing efficiency, restricting the ultrasonic wave propagation within a suitable area in the water to prevent the dispersion of the ultrasonic energy, by means of a pipe made of ultrasonic wave isolating material, e.g., a plastic pipe.

A still further object of this invention is to provide an ultrasonic air humidifying apparatus, whose mist producing capacity or efficiency will never be interfered with by accumulation of dirt particles or mineral substance in the water vessel, with the ultrasonic vibrator being spaced upward from the bottom of the water vessel.

These and other objects, features and advantages of this invention will become more apparent during the course of the following detailed description and appended claims.

BRIEF DESCRIPTION OF THE DRAWINGS

FIG. 3 is a top view, partly in section, of the lower cabinet of the air humidifying apparatus of FIG. 1;

FIG. 4 is a front elevational view of the lower cabinet of FIG. 3;

FIG. 5 is a top view of an ultrasonic vibrator assembly according to the present invention;

FIG. 6 is a vertical sectional view of the ultrasonic vibrator assembly shown in FIG. 5;

FIG. 7 is a vertical sectional view of the ultrasonic vibrator shown in FIG. 6;

FIG. 8 is a bottom view of the ultrasonic vibrator of FIG. 7; and

FIG. 9 is a vertical sectional view of a cap of a water supply tank according to the present invention.

DETAILED DESCRIPTION OF THE PREFERRED EMBODIMENT

Figure 1:
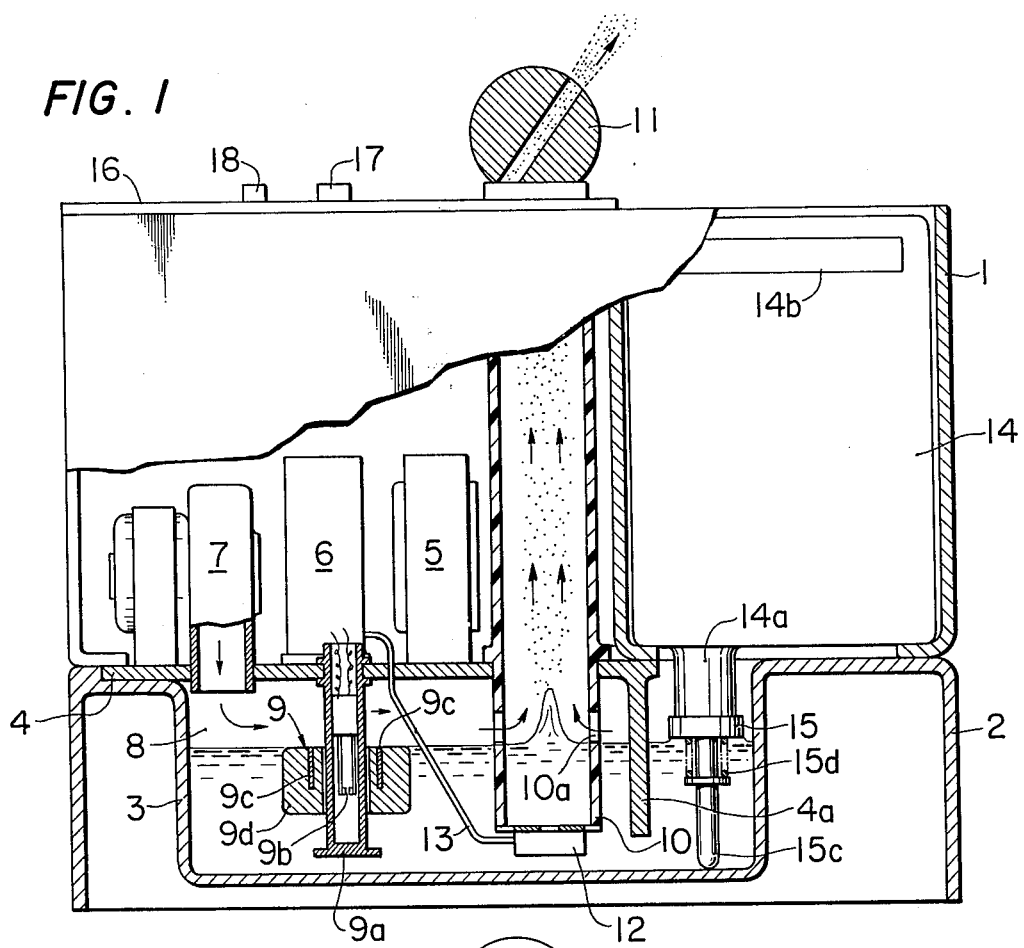
FIG. 1 is a front elevational view, partly in section, of an embodiment of the air humidifying apparatus according to the present invention.
Figure 2:
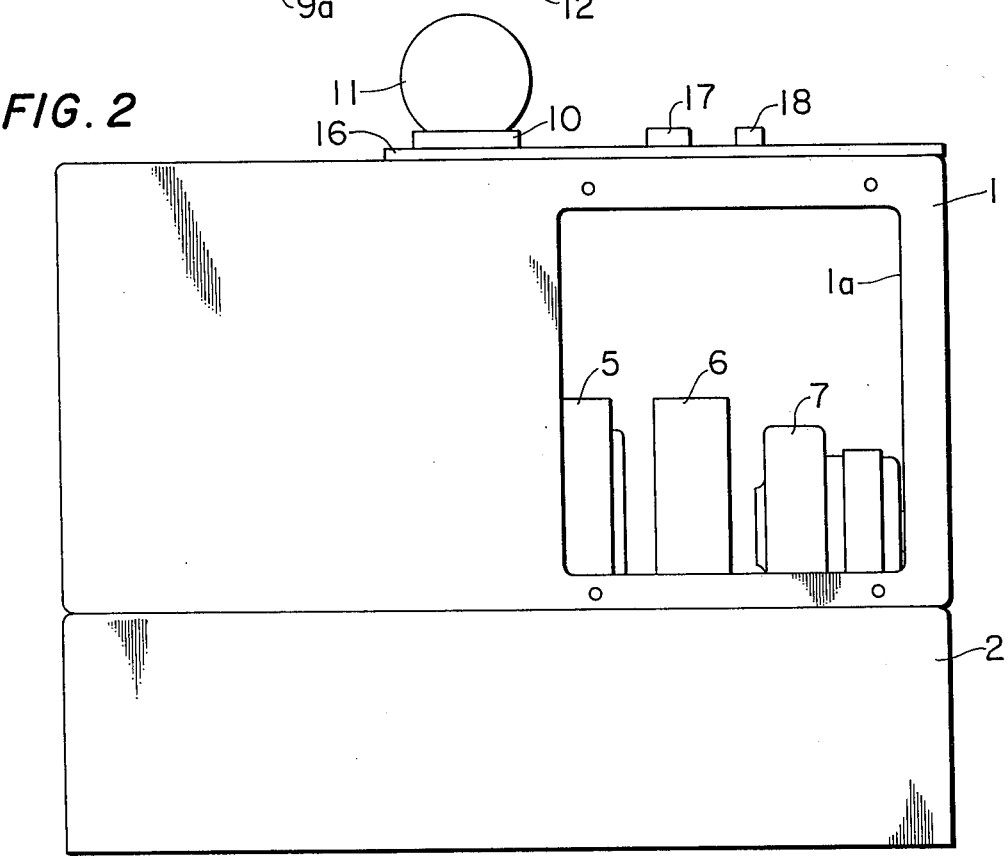
FIG. 2 is a rear elevational view of the air humidifying apparatus of FIG. 1, rear cover board being removed therefrom.

The ultrasonic air humidifying apparatus is generally placed horizontally on the floor in the room in the house or in an office room.

As shown in FIGS. 1 to 4, the ultrasonic air humidifying apparatus according to the present invention comprises an uper cabinet 1 rectangular in its entirety and a lower cabinet 2 arranged below this upper cabinet 1 and rectangular in its entirety. The upper cabinet 1 is substantially open in the bottom part, the lower cabinet 2 has a water vessel 3 integrally formed in the central part and the upper cabinet 1 and lower cabinet 2 are separably connected with each other through bolts and nuts or the like not illustrated with a chassis board 4 interposed between them. A power transformer 5, high frequency generator 6 and motor-blower 7 are fixed on the chassis board 4. The primary terminals of the transformer 5 are connected with a regular receptacle not illustrated and its secondary terminals are connected with the high frequency generator 6. This power transformer 5 is not necessarily required depending on the kind of the high frequency generator 6. The motor-blower 7 is driven directly from a commercial current source so as to be able to feed air into a space 8 defined by the peripheral wall of the water vessel 3, the surface of water contained in the water vessel 3, the chassis board 4 and a partition plate 4a suspended into the water vessel 3 from the chassis board 4. A magnetically operated level drop detector 9 for detecting that the amount of water, that is, the level of water in the water vessel 3 has come to be below a predetermined value is provided in the water vessel 3. This detector 9 comprises a float guide 9a secured to the chassis board 4 and extending downward, a magnetically operated switch 9b contained in the float guide 9a and a float 9d having two bar magnets 9c embedded in it and slidably fitted to the float guide 9a so that the switch 9b may open to stop the operation of the high frequency generator 6 when the float 9d has dropped to be below a predetermined level and may close to start the operation of the generator 6 when the float 9d is in a position above the predetermined level. A mist conduit pipe 10 made of such ultrasonic wave isolating material as plastics, projecting in the upper part above the top surface of the upper cabinet 1 through the upper cabinet 1 and extending in the lower part near to the bottom part of the water vessel 3 is also fixed to the chassis board 4. A nozzle body 11 fitted so as to be rotatable in all directions is provided so as to be rotatable in all directions at the upper end of the conduit pipe 10 and a later described ultrasonic vibrator assembly 12 is secured to its lower end. A plurality of holes 10a are made on the lower peripheral wall of the mist conduit pipe 10. It is preferable that these holes 10a are provided in a position just above the standard level of water in the water vessel 3. A coaxial cable 13 to feed a high frequency energy to a later described ultrasonic vibrator 12c is connected between the high frequency generator 6 and ultrasonic vibratory assembly 12. A water supply tank 14 is removably fitted within the upper cabinet 1 and is provided with an outlet pipe 14a projecting into the water vessel 3 in the using state and a handle 14b useful in the case of taking the tank 14 out of the upper cabinet 1. A cap 15 having a later detailed valve mechanism incorporated in it is screwed to the lower end part of the outlet pipe 14a. This valve mechanism operates to automatically supply water into the water vessel 3 so as to keep the standard level determined by the lower surface of the cap 15. The upper cabinet 1 is covered in the top part except the part for taking out the water supply tank 14 with a top plate 16 which is provided with a power switch 17 for keeping the power transformer 5 or high frequency generator 6 operative or inoperative and a lamp 18 kept lighted while the power switch 17 is closed to keep the power transformer 5 or high frequency generator 6 operative. An opening 1a is formed in a part on the back wall of the upper cabinet 1 corresponding to the positions wherein such electrical components as the power transformer 5, high frequency generator 6 and motor-blower 7 are positioned so that these electrical components may be easily maintained and inspected. The opening 1a is normally closed with a cover board not illustrated. A plurality of air inlet openings 2a are formed on the front wall of the lower cabinet 2 and a slot-shaped opening 2b for leading air taken in through the openings 2a into the upper cabinet 1 is formed on the top wall.

The details of the above described ultrasonic vibrator assembly 12 are shown in FIGS. 5 and 6. This vibrator assembly 12 comprises a cut-circular electrically insulating bracket having a through hole in the center part and fixed to the lower end of the mist conduit pipe 10 with screws or the like not illustrated and an electrically insulating casing 12b secured to the lower surface of this bracket 12a. Within the casing 12b, there are contained an ultrasonic vibrator 12c made of an electrostrictive material, a terminal plate 12d, a coil spring 12e to resiliently press the vibrator 12c upward and a terminal 12f. As clearly shown in FIGS. 7 and 8, the ultrasonic vibrator 12c is silver-plated over the upper surface and the peripheral edge of the lower surface with an outer electrode 12c' and on the central part of the lower surface with a central electrode 12c''. The outer electrode 12c' is in direct contact with the terminal plate 12d and the central electrode 12c'' is in direct contact with the terminal 12f through the coil spring 12e. An O-ring 12g to keep the interior of the casing 12b below the vibrator 12c airtight is contained in a space defined by the bracket 12a, casing 12b and vibrator 12c. The coaxial cable 13 is inserted into the interior of the casing 12b through a hole made on the periheral wall of the casing 12b. One of the lead wires contained in the cable 13 is connected with the terminal plate 12d and the other lead wire is connected with the terminal 12f. The cable 13 and casing 12b are kept airtight between them with an O-ring 12h. As evident in this explanation, as water in the water vessel 3 comes into the mist conduit pipe 10 through the passages formed between the bracket 12a and the peripheral edge of the lower end of the conduit pipe 10, the level of water in the conduit pipe 10 and that of water in the water vessel 3 are identical with each other. Further, the upper surface of the vibrator 12c is in direct contact with water in the conduit pipe 10.

The details of the above described valve mechanism are shown in FIG. 9. The valve mechanism comprises a valve seat portion 15a' formed on the upper edge of an inside wall 15a of the cap 15, a guide piece 15b cut-circular in the cross-section and secured to the inside surface of the inside wall 15a, a valve rod 15c guided by the guide piece 15b, a coil spring 15d resiliently pressing the valve rod 15c downward and a valve member 15e secured to the upper part of the valve rod 15c and capable of being seated on the valve seat portion 15a'. As evident in this explanation, when the water supply tank 14 has been taken out of the upper cabinet 1, the valve member 15e will be forcibly seated on the valve seat portion 15a' by the coil spring 15d and therefore the water in the tank 14 will not flow out but, when the tank 14 is fitted in a predetermined position in the upper cabinet 1 as shown in FIG. 1, the valve rod 15c will be pushed up at the lower end to be above the bottom surface of the water vessel 3, therefore, the valve member 15e will separate from the valve seat portion 15a', and the water in the tank 14 will be able to flow out into the water vessel 3 through the gaps between the inside wall 15a and guide piece 15b. However, this outflow will be made only while the water surface, that is, the water level in the water vessel 3 has dropped to be below the lower end surface of the cap 15 and there is a clearance between the water surface and the lower end surface of the cap 15.

The operation of the above described apparatus shall be explained in the following.

If the power switch 17 is operated while the water level in the water vessel 3 is on the standard level as shown in FIG. 1, the power transformer 5, high frequency generator 6 and motor-blower 7 will be in an operating state, a high frequency electric power will be fed to the ultrasonic vibrator 12c through the cable 13 from the generator 6 and an ultrasonic energy will be fed into the water defined by the conduit pipe 10. The ultrasonic energy will propagate upward without being dispersed and will swell the surface of water so as to be in the form of a point. The ultrasonic energy will concentrate at the apex of the point formed on the water surface and mist or water droplets of a diameter less than 5 microns will be produced there. The air current fed out of the motor-blower 7 into the space 8 will advance as indicated by the arrows into the conduit pipe 10 through the holes 10a, will rise through the conduit pipe 10 together with the mist produced as described above and will blow out of the nozzle 11. When the water level in the water vessel 3 drops due to such misting of water until a clearance is produced between the water surface and the lower end surface of the cap 15, the atmosphere will come into the water supply tank 14 and water will flow out of the tank 14 into the water vessel 3. Therefore, the water level in the water vessel 3 will again reach the standard level and the flow of water out of the tank 14 will stop. Thus, the water level in the water vessel 3 will be kept substantially on the standard level so long as there is water in the tank 14 and, as a result, the mist producing efficiency or capacity will be able to be kept in the best condition. However, in case the water in the water supply tank 14 is gone, the water level in the water vessel 3 will continue to drop. In such case, the float 9d will also drop with the drop of the water level. Therefore, when the water level has dropped to be below a predetermined value, the switch 9b will be opened to stop the operation of the generator 6 and motor-blower 7. At the same time, if a warning lamp is made to be lighted, the shortage of water in the water supply tank 14 will be able to be automatically informed. In case the water in the water supply tank 14 is gone, if the tank 14 is taken out of the upper cabint 1 and is overturned so that the outlet pipe 14a may be up, the cap 15 is removed, water is poured into the tank 14 from a water tap, the cap 15 is again screwed onto the outlet pipe 14a and this tank 14 is again fitted in the predetermined position in the upper cabinet 1, the water level in the water vessel 3 will return to the standard water level as described above. Therefore, the switch 9b will close again and the apparatus will resume the operation.

According to the above illustrated embodiment, the water supply means is formed as the water supply tank 14 incorporating the valve mechanism. However, such water supply means may be, for example, a water feeding pipe connected at one end with the water vessel 3 through a float valve provided in the water vessel 3 and at the other end with a water pipe or water tap. Also, in the illustrated embodiment, the chassis board 4 is formed as separated from the upper and lower cabinets 1 and 2. Such chassis board 4 may be formed integrally with the upper cabinet or lower cabinet as a bottom wall of the upper cabinet 1 or a top wall of the lower cabinet 2. Further, in the illustrated embodiment, one ultrasonic vibrator assembly 12 is fixed to the lower end of the conduit pipe 10. A plurality of such assemblies may be fixed.

From the description given so far, it will be noted that the construction of the ultrasonic air humidifying apparatus under this invention has solved all the problems of prior ultrasonic air humidifying apparatus and attains all the aforementioned objects of this invention.

We claim:

1. An ultrasonic air humidifying apparatus comprising an upper cabinet, a lower cabinet separably connected with said upper cabinet, a water vessel formed in said lower cabinet, a chassis board interposed between said upper cabinet and lower cabinet, a high frequency generator fixed on said chassis board, a conduit pipe secured to said chassis board and extending upward in its upper part through said cabinet and extending in its lower part into said water vessel and having holes in a position just above a standard level of water received in said water vessel, an ultrasonic vibrator assembly fixed to the lower end of said conduit pipe spaced from the bottom of said water vessel and connected with said high frequency generator to produce mist from the water within said conduit pipe, a motor-blower fixed on said chassis board for introducing air into said conduit pipe through said holes and conveying the mist within said conduit pipe, and a water supply means for maintaining the water level in said water vessel constant.

2. An ultrasonic air humidifying apparatus according to claim 1, wherein said chassis board is formed integrally with said upper cabinet.

3. An ultrasonic air humidifying apparatus according to claim 1, wherein said chassis board is formed integrally with said lower cabinet.

4. An ultrasonic air humidifying apparatus according to claim 1, wherein said chassis board has a partition plate extending downward from said chassis board to divide said water vessel into two parts.

5. An ultrasonic air humidifying apparatus according to claim 1, wherein said conduit pipe is made of a plastic material.

6. An ultrasonic air humidifying apparatus according to claim 1, wherein said apparatus further comprises a spherical nozzle body placed on the upper end of said conduit pipe so as to be movable in all directions and having a passage therein.

7. An ultrasonic air humidifying apparatus according to claim 1, wherein said ultrasonic vibrator assembly comprises a cut-circular bracket to be fixed to the lower end of said conduit pipe, at least one casing secured to said bracket and an ultrasonic vibrator contained in said casing.

8. An ultrasonic air humidifying apparatus according to claim 1, wherein said apparatus further comprises a power transformer connected with said high frequency generator.

9. An ultrasonic air humidifying apparatus according to claim 1, wherein said water supply means is a water supply tank removably inserted within said upper cabinet and having a cap containing a valve mechanism separably set to its outlet.

10. An ultrasonic air humidifying apparatus according to claim 1, wherein said apparatus further comprises a water level drop detector which is fixed to said chassis board and can stop the operation of said high frequency generator when the water level in said water vessel has dropped to be below a predetermined value.

11. An ultrasonic air humidifying apparatus according to claim 1, wherein said lower cabinet has a plurality of air inlet openings to feed air into said upper cabinet.

12. An ultrasonic air humidifying apparatus according to claim 1, wherein said upper cabinet has on its rear wall an opening useful to inspect the interior of said upper cabinet.

* * * * *